United States Patent [19]
Stefik et al.

[11] Patent Number: 4,814,552
[45] Date of Patent: Mar. 21, 1989

[54] ULTRASOUND POSITION INPUT DEVICE

[75] Inventors: Mark J. Stefik, Portola Valley; J. Courtenay Heater, Cupertino, both of Calif.

[73] Assignee: Xerox Corporation, Stamford, Conn.

[21] Appl. No.: 127,730

[22] Filed: Dec. 2, 1987

[51] Int. Cl.$^4$ .............................................. G08C 21/00
[52] U.S. Cl. .................................... 178/18; 340/706; 367/907
[58] Field of Search ..................... 178/18, 19; 340/706, 340/709; 382/59; 367/907, 124, 129; 434/408; 181/125, 123, 143

[56] References Cited

U.S. PATENT DOCUMENTS

| | | | |
|---|---|---|---|
| 3,626,483 | 12/1969 | Whetstone et al. | 181/0.5 |
| 3,838,212 | 9/1974 | Whetstone et al. | 179/18 |
| 4,246,439 | 1/1981 | Romein | 178/18 |

FOREIGN PATENT DOCUMENTS

A159498 10/1985 European Pat. Off. .

OTHER PUBLICATIONS

IEEE Transactions on Communications, vol. COM-25, No. 11, Nov. 1977, pp. 1433–1440, New York, US; C. N. Judice: "Digital Video: A Buffer-Controlled Dither Processor for Animated Images", *Sections 2, 6; FIG. 1.*

Proceedings of the S.I.D., vol. 17, No. 2, 2nd Quarter 1976, pp. 115–121; B. Lippel: "Two-and Three-Dimensional Ordered Dither in Bi-Level Picture Displays", *Sections III, V.*

Pieter de Bruyne, Compact Large-Area Graphic Digitizer for Personal Computers, Dec. 1986, pp. 49–53, IEEE.

L. G. Roberts, The Lincoln Wand, 1966, Fall Joint Computer Conference, pp. 223–227.

A. Bremmer & P. D. Bruyne, A Sonic Pen: A Digital Stylus System, Jun. 1970, IEEE Transactions, pp. 546–548.

Scriptal Technical Report, Jan. 1985, Report No. SPD-TR2.

Sep. 9, 1985, Electronic Engineering Times, p. 84, "3-D Ultrasonic Input System Competes with Movs, Tablet".

*Primary Examiner*—Stafford D. Schreyer
*Attorney, Agent, or Firm*—Robert E. Cunha

[57] ABSTRACT

This invention is an input device, or stylus, for entering hand drawn forms into a computer comprising a writing instrument, a pressure switch for determining whether the instrument is in contact with the writing surface, an acoustic transmitter for triangulating the position of the stylus on the surface, and a wireless transmitter for transmitting data and timing information to the computer. In operation, the stylus transmits an infra red signal which the system receives immediately, and an ultra sound pulse which two microphones receive after a delay which is a function of the speed of sound and the distance of the stylus from each microphone. From this information the system can calculate the position of the stylus. Switches for indicating functions are mounted on the stylus. Multiple stylusses can be used, each transmitting a distinctive identification code so that the system can determine which stylus is the signal source.

4 Claims, 21 Drawing Sheets

| REFERENCE DESIGNATION | DEVICE TYPE | +5V | GND |
|---|---|---|---|
| U1 | 74C14 | 14 | 7 |
| U2 | DSCMOD. 1MHZ | 14 | 7 |
| U3 | CD4020 | 16 | 8 |
| U4, 5, 6, 9 | 74C174 | 16 | 8 |
| U7, 8 | 2716 | 24 | 12 |
| U10 | 74ALS08 | 16 | 8 |

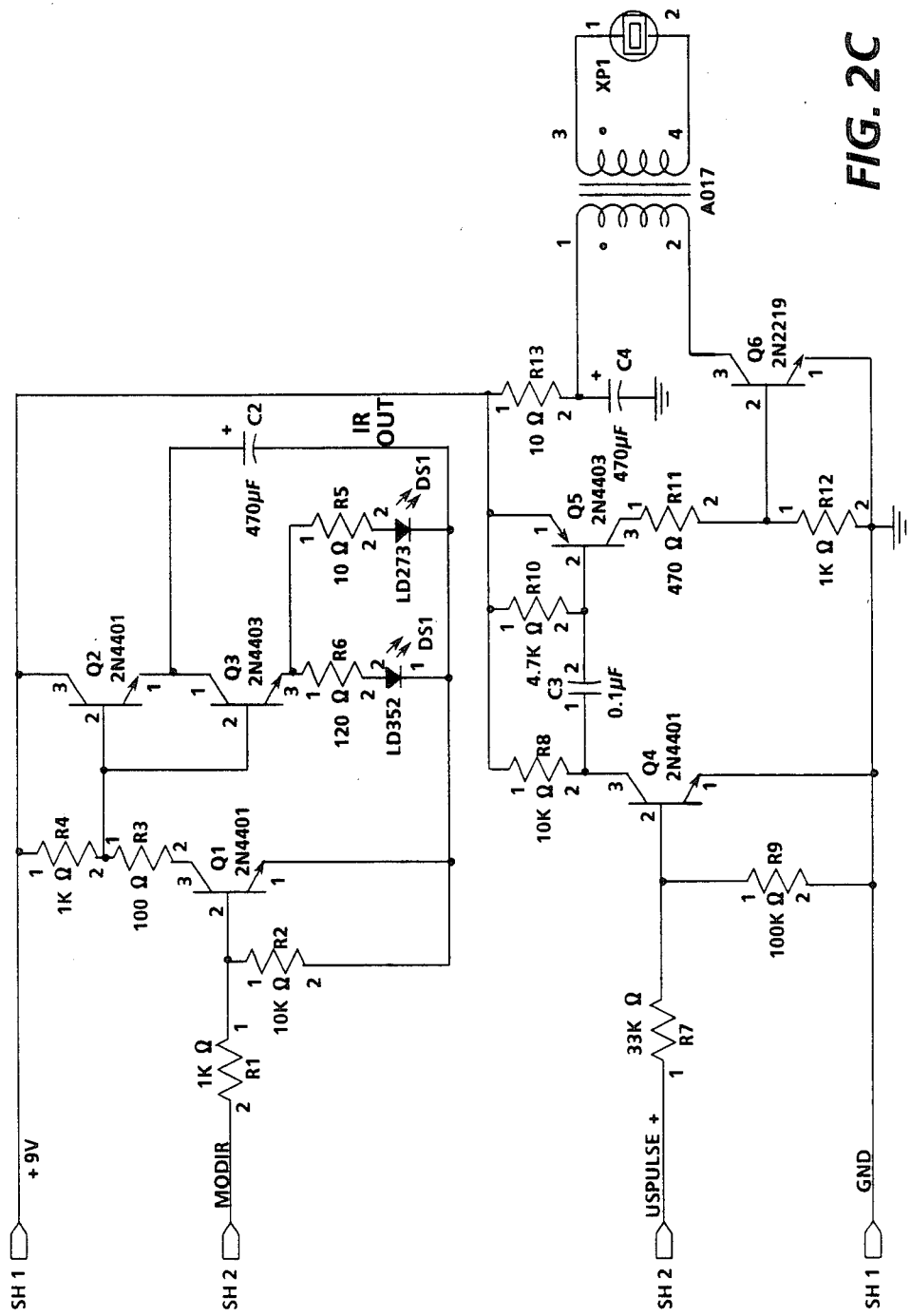

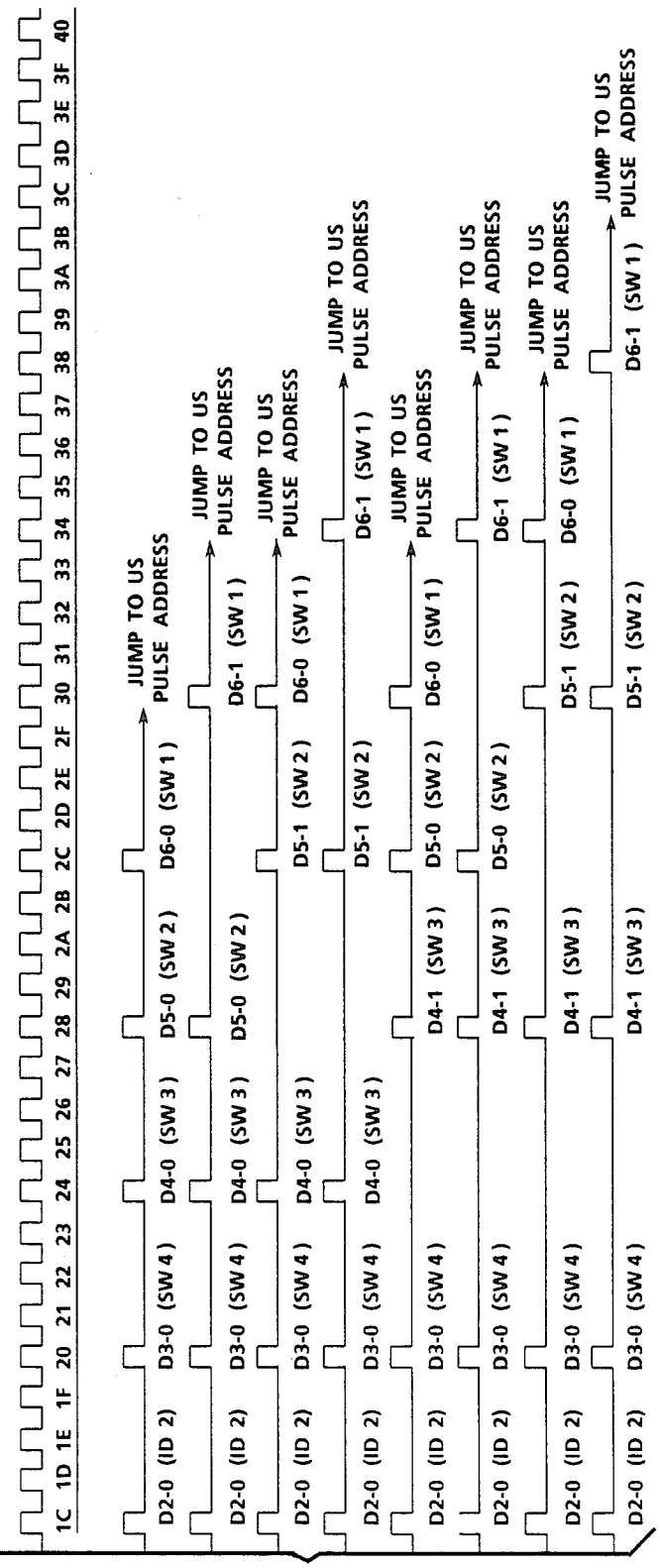

| REFERENCE DESIGNATION | DEVICE TYPE | +5V | GND |
|---|---|---|---|
| U4 | 16L8 | 20 | 10 |
| U24,34 | 2716 | 24 | 12 |
| U5 | 74ALS04 | 14 | 7 |
| U6,7 | 74ALS138 | 16 | 8 |
| U17,18,19,20,26,27,28 | 74ALS161 | 16 | 8 |
| U2,3,21 | 74ALS244 | 20 | 10 |
| U8 | 74ALS245 | 20 | 10 |
| U22,25,30,32 | 74ALS273 | 20 | 10 |
| U9,10,11,12,13,14,15,16,31,33 | 74ALS374 | 20 | 10 |
| U29 | 74ALS74 | 14 | 7 |
| U23 | 82S131 | 16 | 8 |
| U1 | OSCMOD, 1MHZ | 14 | 7 |

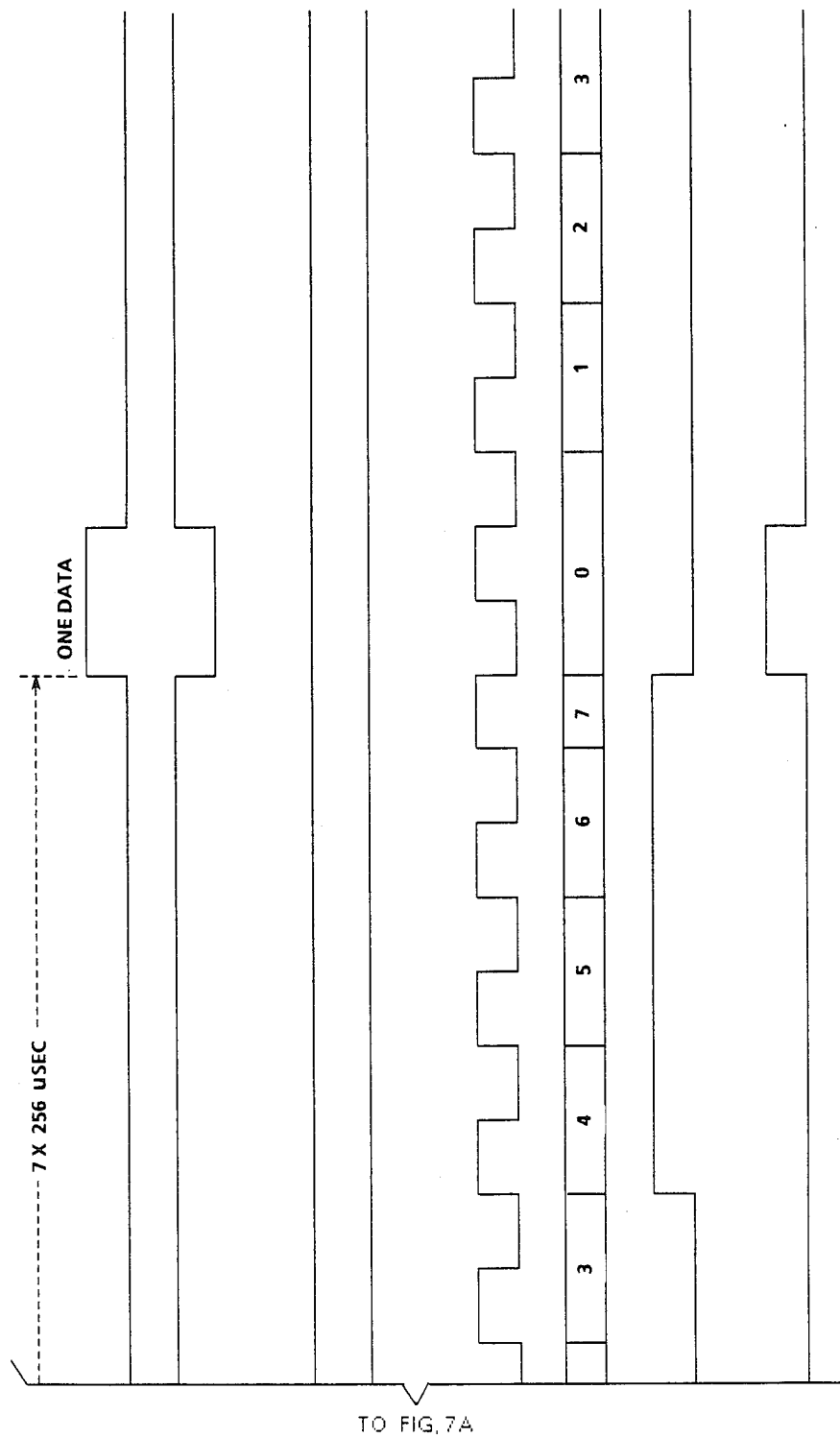

ULTRASOUND POSITION INPUT DEVICE

BACKGROUND OF THE INVENTION

This invention is a stylus for entering hand drawn letters or forms into a computer system, and more specifically is a writing instrument coupled to ultrasonic and IR transmitters which allow the system to continuously determine the position of the stylus.

There has long been a need in the industry for a device for efficiently and conveniently entering handwritten material into a computer. An example of this application would be for a person to sign his name on a sheet of paper in a normal and natural way, and simultaneously have the signature appear on a terminal and be stored in memory.

One well known method is to use sound transmitters and sound receivers to send audio waves between the stylus and two points on the writing surface, typically two corners. The delay of the sound waves between the stylus and the two corners allows the triangulation of the position of the stylus. However, none of the known devices for accomplishing this method are satisfactory.

One embodiment uses a spark gap mounted on the writing instrument to generate the sound wave, but this embodiment is unsatisfactory. The external high voltage spark gap is inconvenient and possibly dangerous. The system requires a cord to be attached to the stylus to supply the high voltage, which would be an inconvenience, especially when writing over a large writing surface. The shock wave produced by the spark is audible and a possible distraction to the user, and the sound produced by this method has a broad range of frequencies so the receiver can not be narrowly tuned to avoid noise. A device which uses a spark gap is described in a June 1970 IEEE Transactions On Computers article by A. E. Brenner and P. de Bruyne entitled A Sonic Pen: A Digital Stylus System, and in another December 1986 IEEE C G & A article by Pieter de Bruyne entitled Compact Large Area Graphic Digitizer for Personal Computers. Another is described in U.S. Pat. No. 3,626,483 by Whetstone et al entitled Spark Pen.

The Sonic Pen of Brenner was made cordless by using two stationary spark generators and a microphone in the moveable stylus. In this configuration, high voltage need not be delivered to the stylus. The drawbacks are the noise of the spark generators, and the necessity of pulsing the transmitters alternately, which reduces to half the number of position readings per unit of time.

Another element the stylus must have is a means for automatically signaling to the system, without any action required on the part of the writer, when the writing instrument is in contact with the writing surface. This would take the form of a position or pressure sensor mechanically coupled to the point of the writing instrument. Without this feature, the entrance of hand drawn script, block letters and drawings into the system would be very difficult. Stylusses having some elements of this invention but lacking this particular feature are described in a 1966 article in the Proceedings - Fall Joint Computer Conference by Lawrence G. Roberts entitled The Lincoln Wand, and in a Sept. 9, 1985 article on page 84 of the Electronic Engineering Times headlined 3-D Ultrasonic Input System Competes With Mouse, Tablet.

The device described in European Pat. No. A 159 498 is cordless and has a contact sensor, but it does not use sonic triangulation and is therefore limited to use with a particular magnetic tablet.

In conjunction with the other features, it would be desirable for the stylus to have function switches. These could indicate to the system, for example, what color the line is being drawn in, whether the line is dashed or solid, whether the stylus is being used as a pen, an eraser or a pointer, etc. It is not novel to put function switches in an electronic system as in FIG. 4 of the above referenced Brenner and Bruyne article. The novelty in this invention is that the switches are mounted on the stylus so that the operator need not take his hands and eyes away from the writing surface while changing functions. An example of a stylus having function switches is described in Technical Report No: SPD-TR2, dated Jan. 1985, published by Scriptel Corp., 3660 Parkway Lane, Hilliard, Ohio 43026. However, this device lacks most of the other features described above, and can not be used for the purpose of this invention. Furthermore, normal writing involves the use of the wrist and fingers. A mouse or puck, as shown in this Scriptel report, does not have the look and feel of a pen or pencil, and can not be used in the normal way as a writing instrument.

What is required is a stylus that will allow normal writing or pointing on any surface, and simultaneously will enter the result into memory.

SUMMARY OF THE INVENTION

This invention is a computer input device containing a writing instrument, an ultrasonic transmitter for emitting bursts of sound to allow microphones in the system to triangulate the stylus' position, a wireless infra red (IR) connection of timing and data information to the system controller to allow natural movement of the stylus without the inconvenience of a connecting cord, and a switch on the stylus to sense whether the stylus is in contact with the surface being written on. A further refinement is a plurality of finger operated switches on the stylus which can be used to indicate the various stylus functions. This combination allows writing on any surface (black or white board, paper, CRT, etc) using any writing instrument (ball point, pencil, felt tip marker, etc) in a natural manner while simultaneously entering the same information into an electronic, or computerized, system. In addition to being able to write, this stylus can also be used as a pointer, or as an area designator. For example, the stylus can be used to circle an area within which the contents may be erased, magnified, or changed in any other way. A specific use in making drawings would be to make corrections by designating an area to be erased, and then writing a correction into the space.

The stylus communicates with the remainder of the system which consists of two microphones, an IR receiver, and a controller circuit which processes the information into a form acceptable by a computer. The microphones are typically located at the upper corners of the writing surface, the IR receiver would typically be placed at any point along the upper edge of the writing surface, and the controller circuit would be a circuit board either contained in its own enclosure or plugged into a card slot in the computer. In this disclosed embodiment, the IR transmitter transmits a series of pulses which communicate the status of the switches to the circuit board, and the sound pulse is timed to start at the end of this pulse train.

BRIEF DESCRIPTION OF THE DRAWINGS

FIGS. 2A-1, 2A-2, 2B-1, 2B-2 and 2C are schematic drawings of the transmitter sequencer of FIG. 1.

FIGS. 3A-1 to 3B-2 and are timing diagrams of the transmitted IR pulses.

FIGS. 6A-1, 6A-2 and 6B–6E are schematic diagrams of the receiver logic subsystem of
FIG. 1.

FIGS. 7A and 7B are a timing diagram of receiver data demodulation.

DESCRIPTION OF THE PREFERRED EMBODIMENT

Figure 1A:
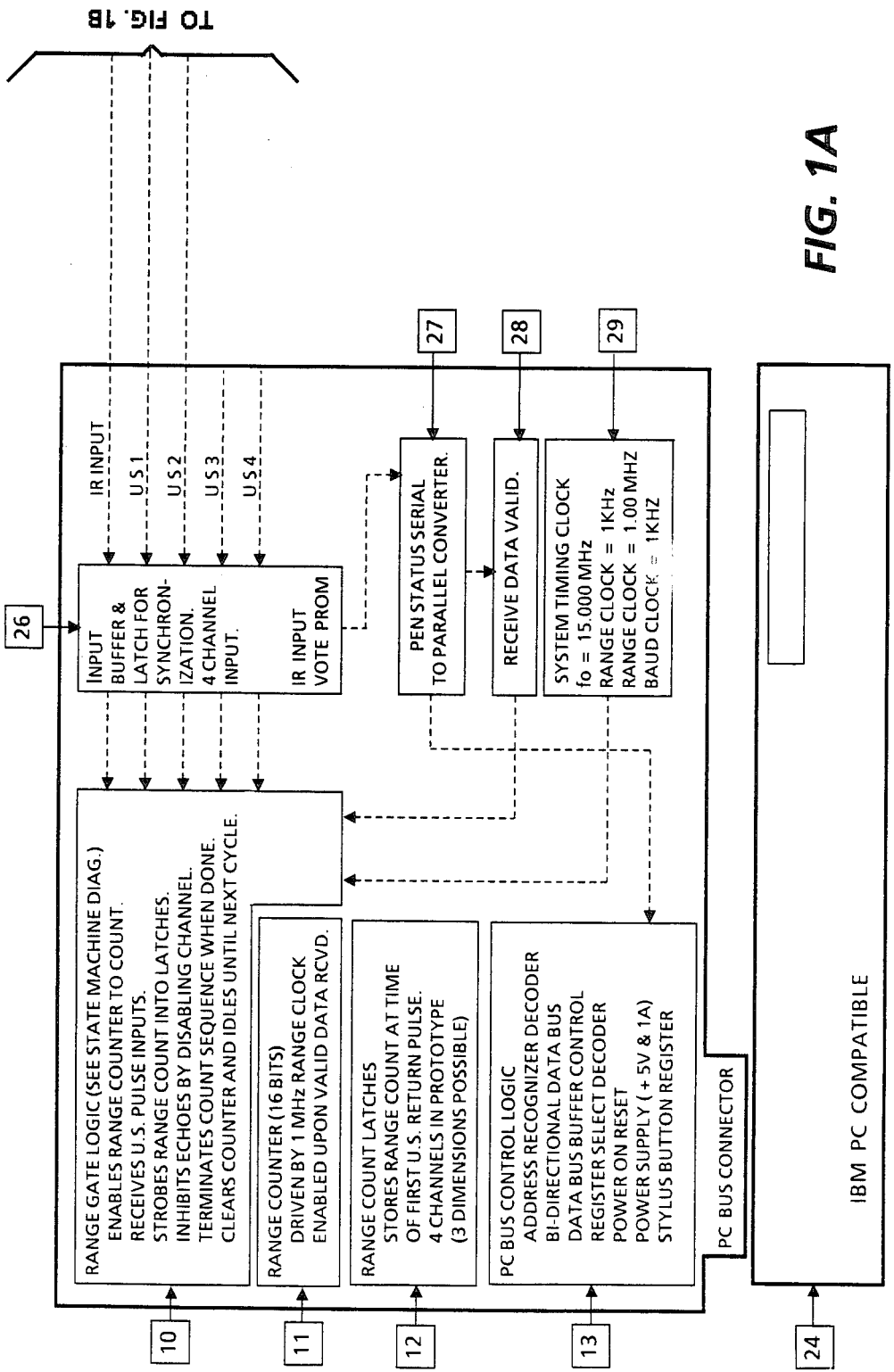
FIGS. 1A and 1B are a system block diagram.
Figure 1B:
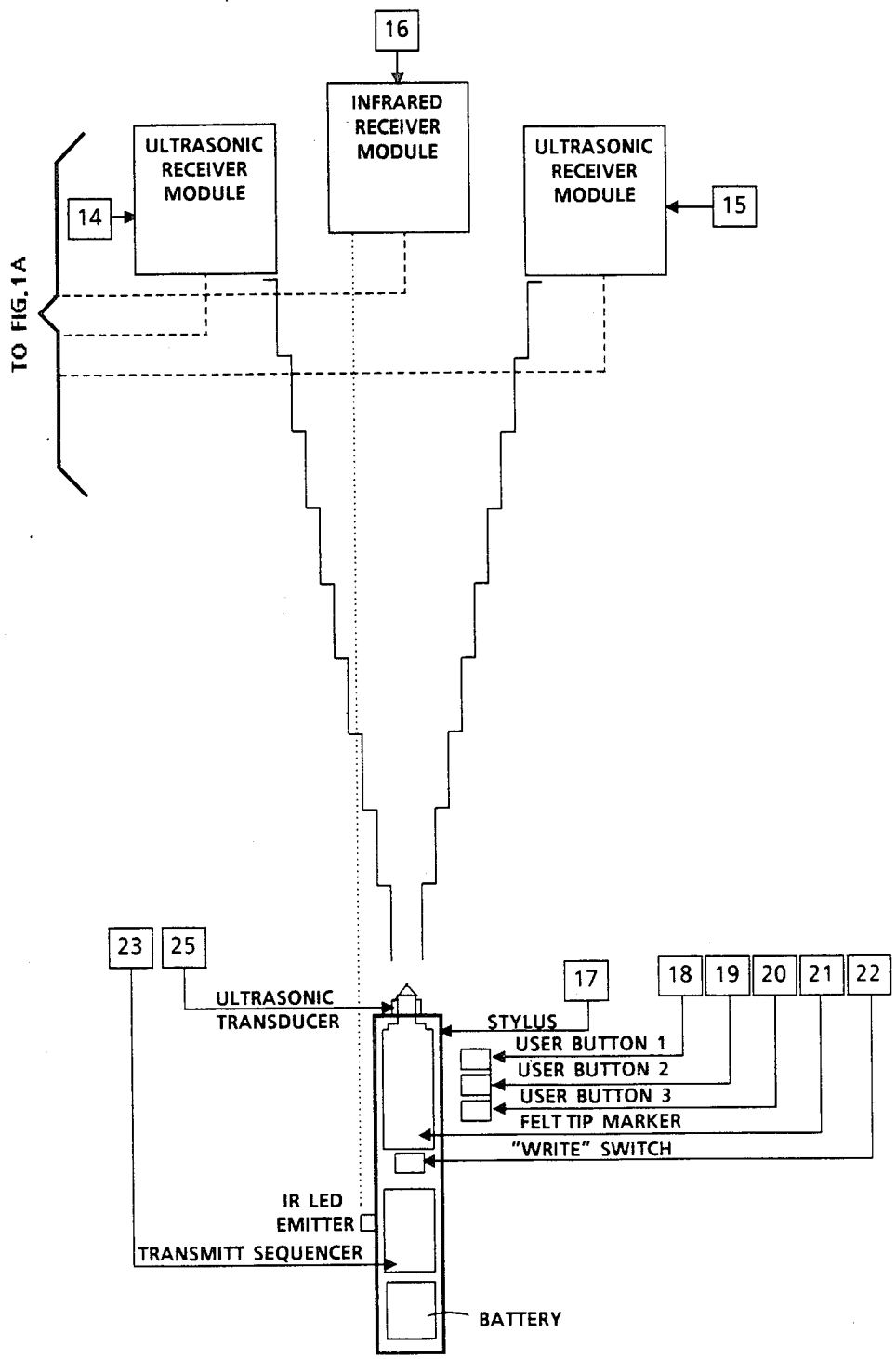
Figures 1, 2, 2A:
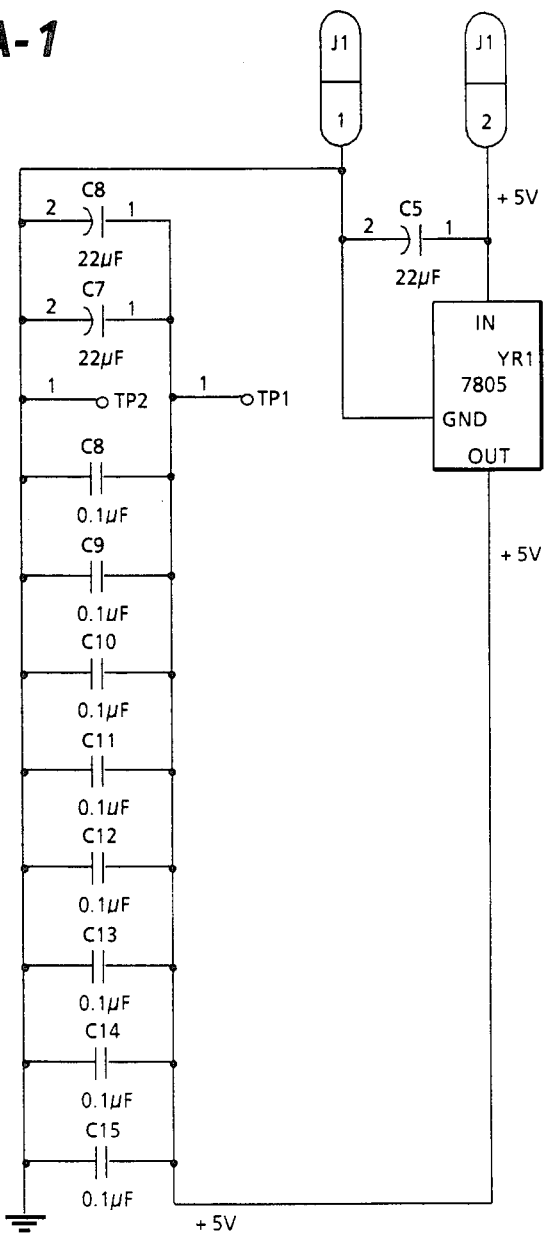

FIG. 1 is an overview of the system. The stylus 17 is a cylindrical enclosure that contains a writing element, in this case a felt tip marker 21 suitable for writing on a white board. When the marker contacts the board the "write" switch 22 is closed, enabling a transmitter 23 to transmit IR communication pulses and an ultrasonic location pulse. The IR transmitter can be located anywhere on the stylus 17 but the ultrasonic transducer 25 must be located near the marker tip. In addition, there are three finger activated function switches 18 19 20, the status of these switches being encoded into the IR transmission.

As a minimum there must be two ultrasonic receivers 14 15, or microphones, typically located at the two upper corners of the writing surface, and an IR receiver 16, typically located in one of the microphone enclosures.

The three receivers are connected by wire to input buffers 26 in the receiver logic subsystem, where the serial IR pulses are converted into parallel form at block 27. The circuit of block 28 tests this word, and if valid, issues a Valid Data signal to the range gate logic 10 and starts the system timing clock 29.

The range gate logic 10 is a state machine which reacts to the valid data signal and the timing clock to command the range counter 11 to measure the delay between the end of the last IR pulse and the reception of the sonic pulses by counting and then latching the counts into two latches 12. The counter is driven by a clock with a period of one microsecond, which is the time required for a sound wave to travel about one hundreth of an inch. The circuit then resets and waits for the next cycle. Finally, the logic 10 enables the PC bus control logic 13 to output the data to the computer 24 which in this embodiment is an IBM PC or equivalent.

The schematic diagram in FIG. 2A shows the power source for the transmitter sequencer. A nine volt battery provides power for the logic circuits through regulator VR1.

Figures 1, 2B:
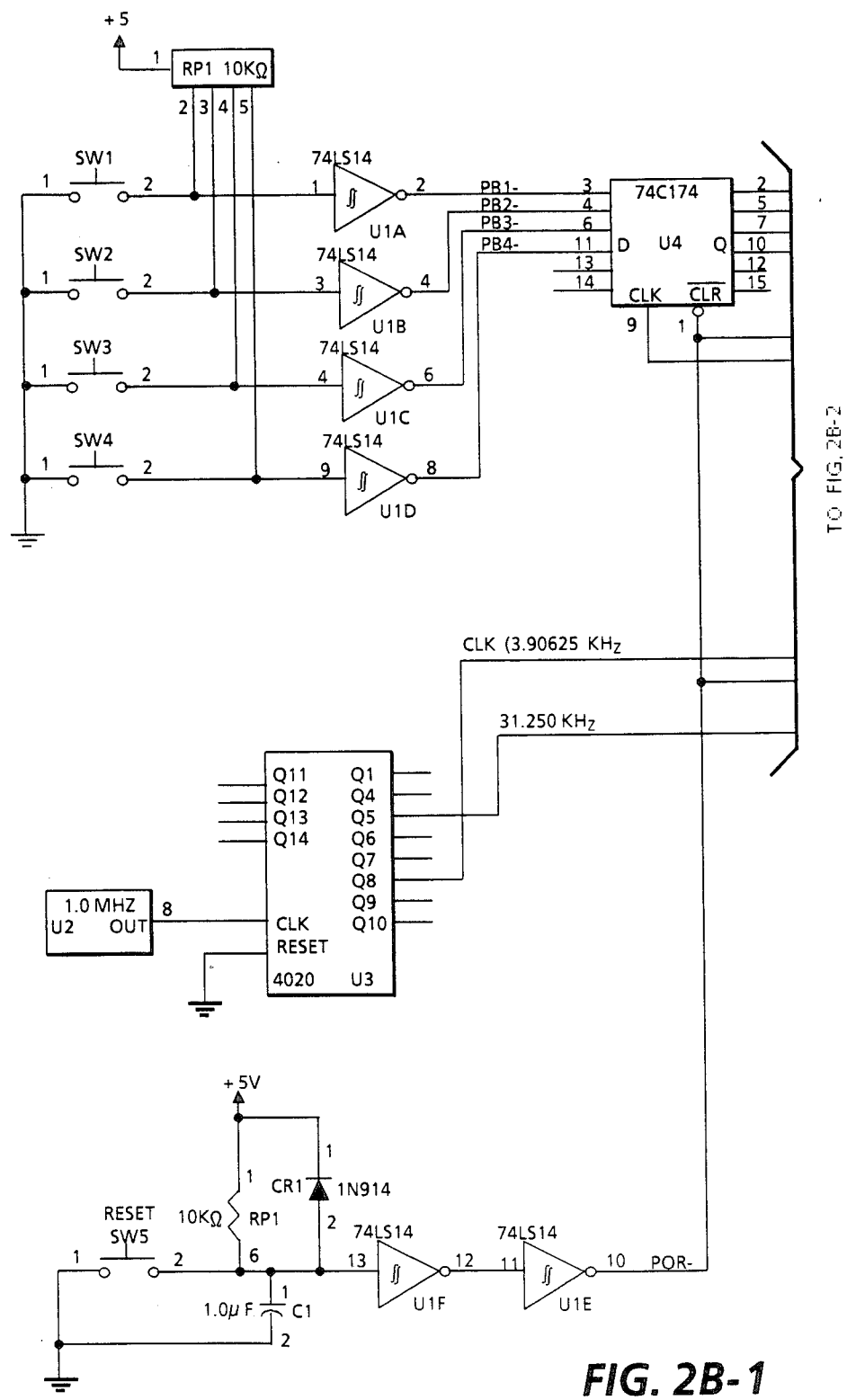
Figures 2, 2B:
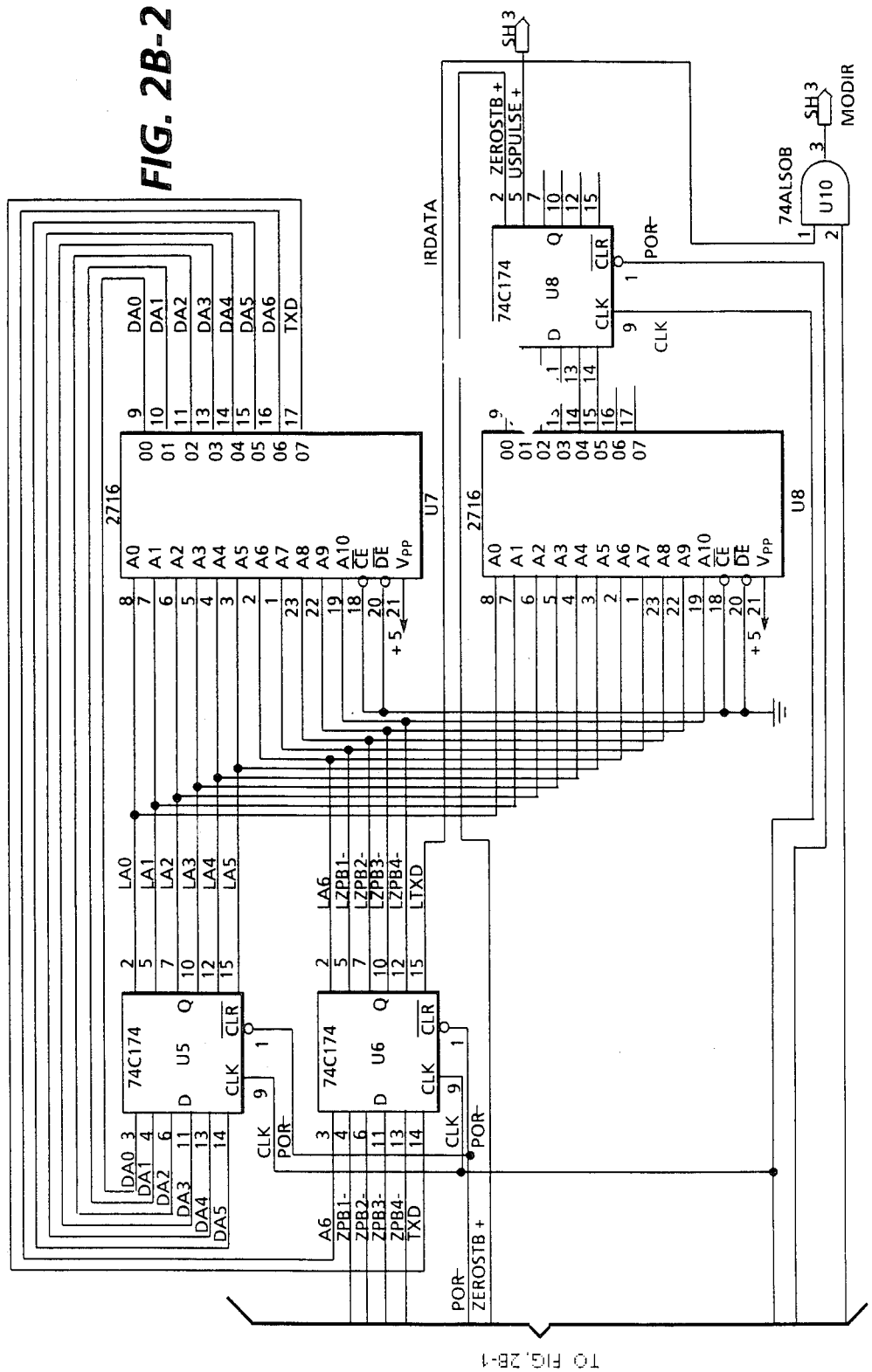

FIG. 2B is the schematic diagram of the IR transmitter sequencer. This circuit generates and transmits a series of IR pulses which signal to the controller the state of the switches. It also indicates to the controller the timing of the origin of the sound pulse since the sound pulse is started shortly after the time of the last IR pulse.

The timing element for this circuit is a set of PROMS U7 and U8, part number 2716, coupled through latch U5, part number 74C174. In the remaining discussion of the schematics only part numbers not shown in the drawings will be specified in the text. The PROMS are clocked by a clock pulse received from a clock generator comprising a crystal controlled oscillator U2, counted down through counter U3. The output of the PROMS are latched through latch U5, the output of which is coupled back to the input address lines of the PROMS. Each output word from the PROM contains the address of the next word to be accessed, so that once the PROM has been started on a particular sequence, it will step through a predetermined set of locations.

At the same time, the circuit is monitoring the four stylus switches. The first one, S1, closes when the stylus is in contact with the writing surface. The other three S2 S3 S4 are the three finger operated function switches. The resultant four switch operated dc levels are coupled through inverters U1 A–D, to drive four more address lines of the PROMS. The PROMS contain a number of sequences. The switches then select one of them, and the PROMS U7 U8 and latch U5 will then step through the selected sequence. When the power is turned on, or by depressing S5, a signal is coupled through two inverters U1 F and E to reset and initialize the PROMS U7 U8.

One final bit in memory, pin 17 of PROM U7, is the output bit which is used to drive the IR transmitter. The output bit can be modulated by a 32 KHz carrier to reduce battery consumption. It is then coupled to an amplifier Q1, and then to a set of transistors, Q2 and Q3 which alternately conduct. When emitter follower Q2 conducts, capacitor C2 charges to a positive voltage. Next, transistor Q3 conducts, supplying a high current pulse to the IR LED DS1.

FIG. 2C is a schematic diagram of the ultrasonic driver circuit. A digital pulse is supplied at the input and is amplified through three amplifier stages comprising transistors Q4, Q5 and Q6. All stages are driven from saturation to cut off, and supply a square current pulse to the output transformer. The current through the primary of the transformer must travel through the transistor Q6 and through resistor R13 and therefore builds up relatively slowly, resulting in a relatively small output voltage at the output of the secondary winding. However, when the transistor Q6 cuts off, the field around the transformer collapses instantly, producing a sharp voltage spike at the output. This is used to produce a sharply defined sound pulse from the ultra sound transducer XP1, Murata Part No. 40S2.

Figures 1, 3A:
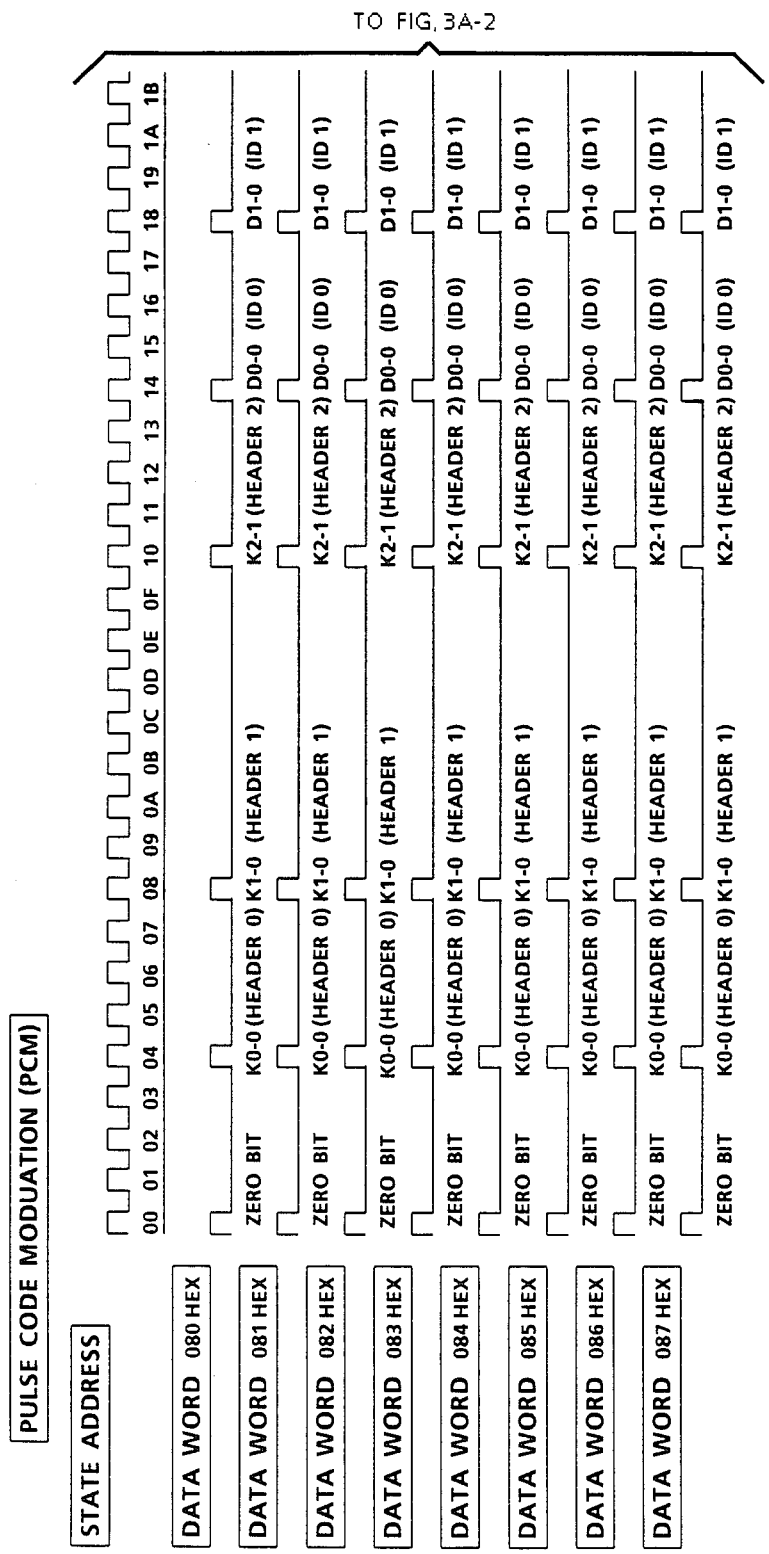
Figures 1, 3B:
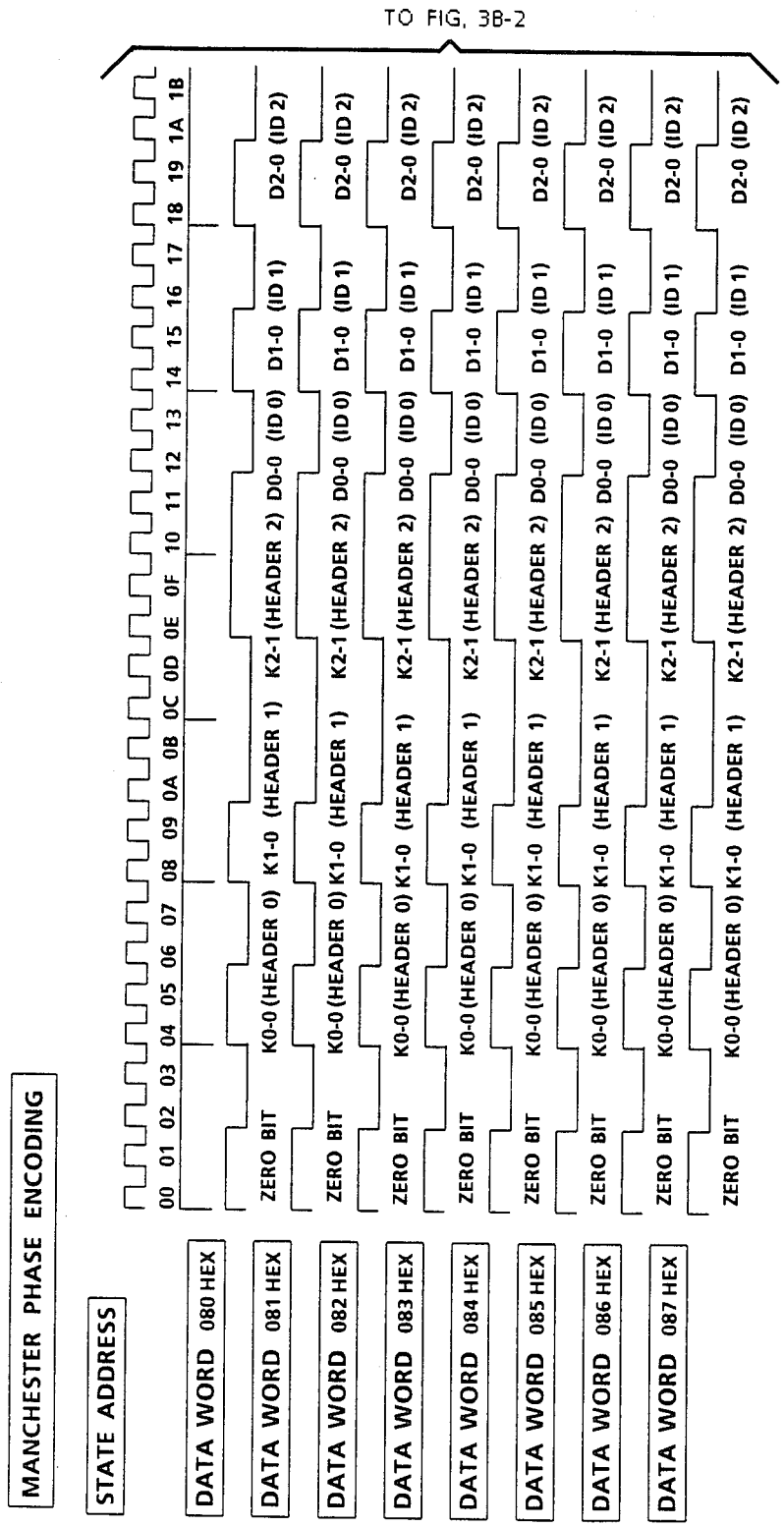
Figures 2, 3B:
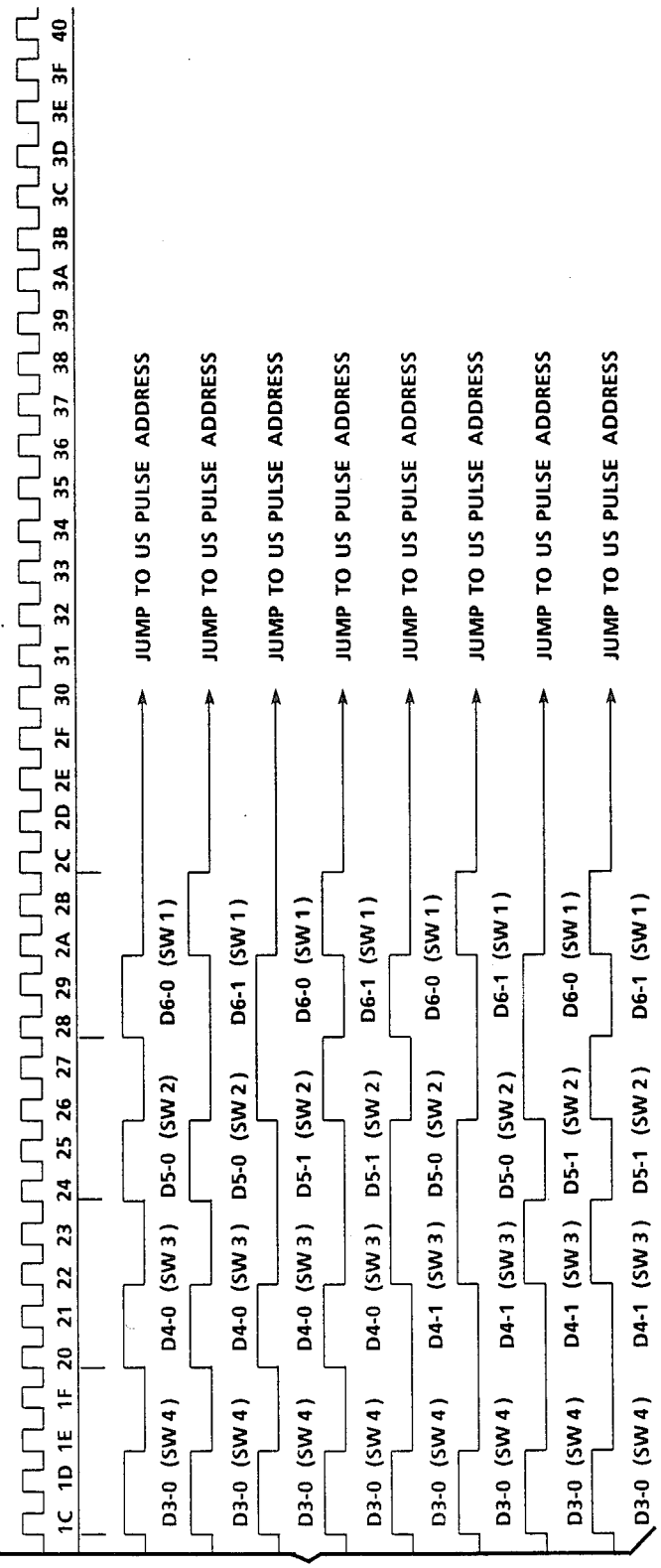

FIGS. 3A and 3B show two different methods of encoding data into a serial bitstream. FIG. 3A shows Pulse Code Modulation (PCM) and is the most efficient way to transmit IR data. FIG. 3B shows Manchester Phase encoding. PCM encoding has the advantage over Manchester Phase encoding that it has the lowest duty cycle of IR LED usage. Since each pulse represents a high current drain on the battery, it is desireable to minimize the duration of this pulse.

The sequence of FIG. 3A begins at address 00 and progresses upward through the count sequence itemized in the State address count (represented in hexadecimal). The rule of Pulse Code Modulation states that a bit is a Zero if the period between successive pulses is less than four clock transitions. A One bit is represented by a period of 8 clock ticks between data pulses. The waveforms shown include a Zero bit three Header bits and seven data bits. The first three data bits are the code assigned to the pen (PEN ID) and the remaining four bits represent the push button switches. Eight combinations of push buttons are depicted in each group although more combinations of Headers, ID's and Data bits are possible.

The timing waveforms of FIG. 3B come under the heading of Manchester Phase Encoding. This embodiment of data pulses has the advantage of the a non-variable message length regardless of the states of the encoded bits. The rule of Manchester coding is that each bit cell contains a mid-bit transition. This encoding method produces a Zero for high to low transitions and a One for low to high transitions. The relevant transitions occur at center of each bit cell (e.g. 02, 06, 0A ...). The same eight data sequences are indicated in this example. Other features might include a parity bit, or checksum to verify transmission integrity.

Figure 4A:
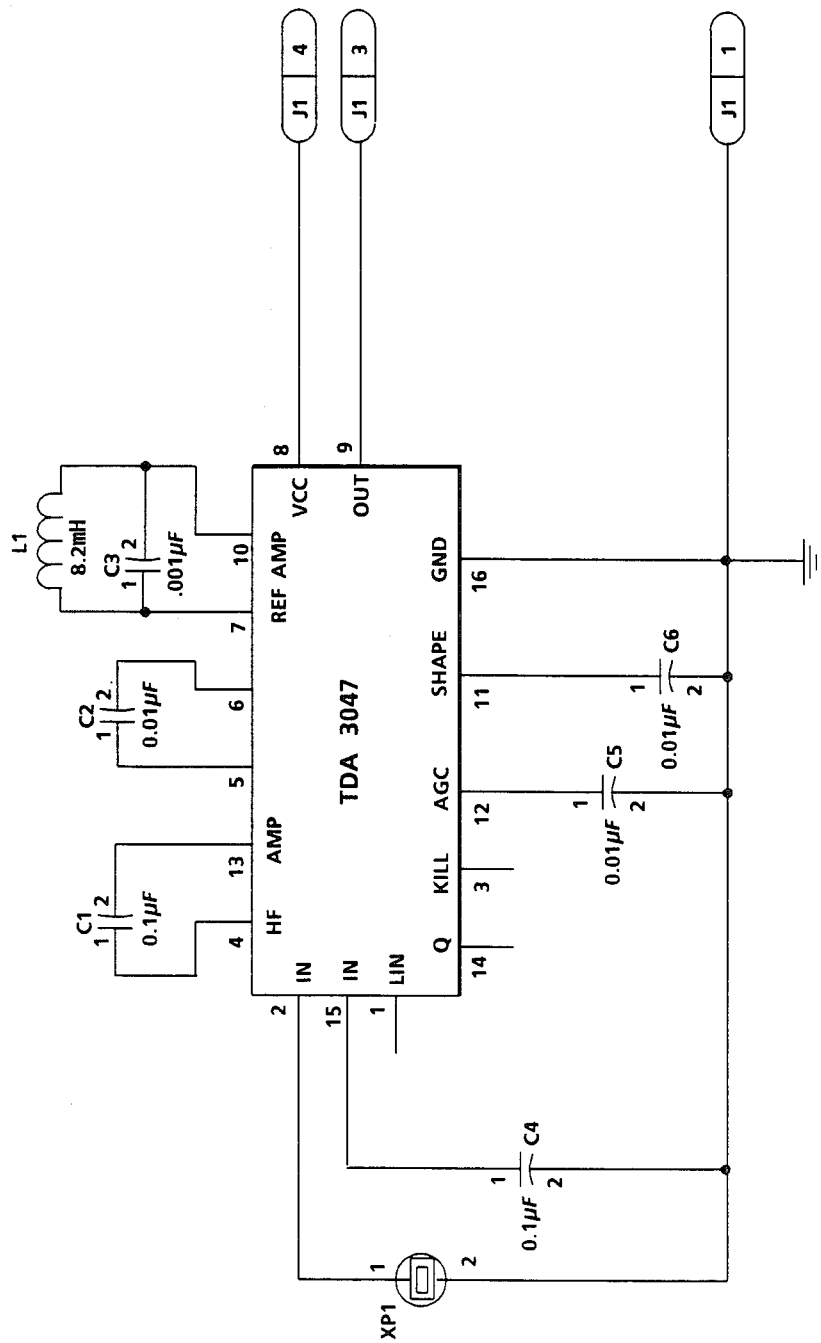
FIGS. 4A and 4B are schematic diagrams of the ultrasonic and IR receiver
modules of FIG. 1.

FIG. 4A is a schematic diagram of the ultrasonic amplifier/detector, based on the Signetics or Phillips part number TDA 3047. One important element of this part is the automatic gain control (AGC) over a range of 66 db built into the front end amplifier. This is a necessity because the amplitude of the sound input varies inversely as the square of the distance of the stylus from the microphones. The TTL compatible output at pin 9 is a digital pulse, the output transition from false to true corresponding to the time that the first sound cycle peaks at the input.

The transducer attached to input pin 2 is a Projects Unlimited SQ40R part, tuned to 40 KHz. Similarly, the tank circuit atttached to pins 7 and 10 tunes the internal amplifier to 40 KHz. The remainder of the attached components control the characteristics of the automatic gain and amplification.

Figure 4B:
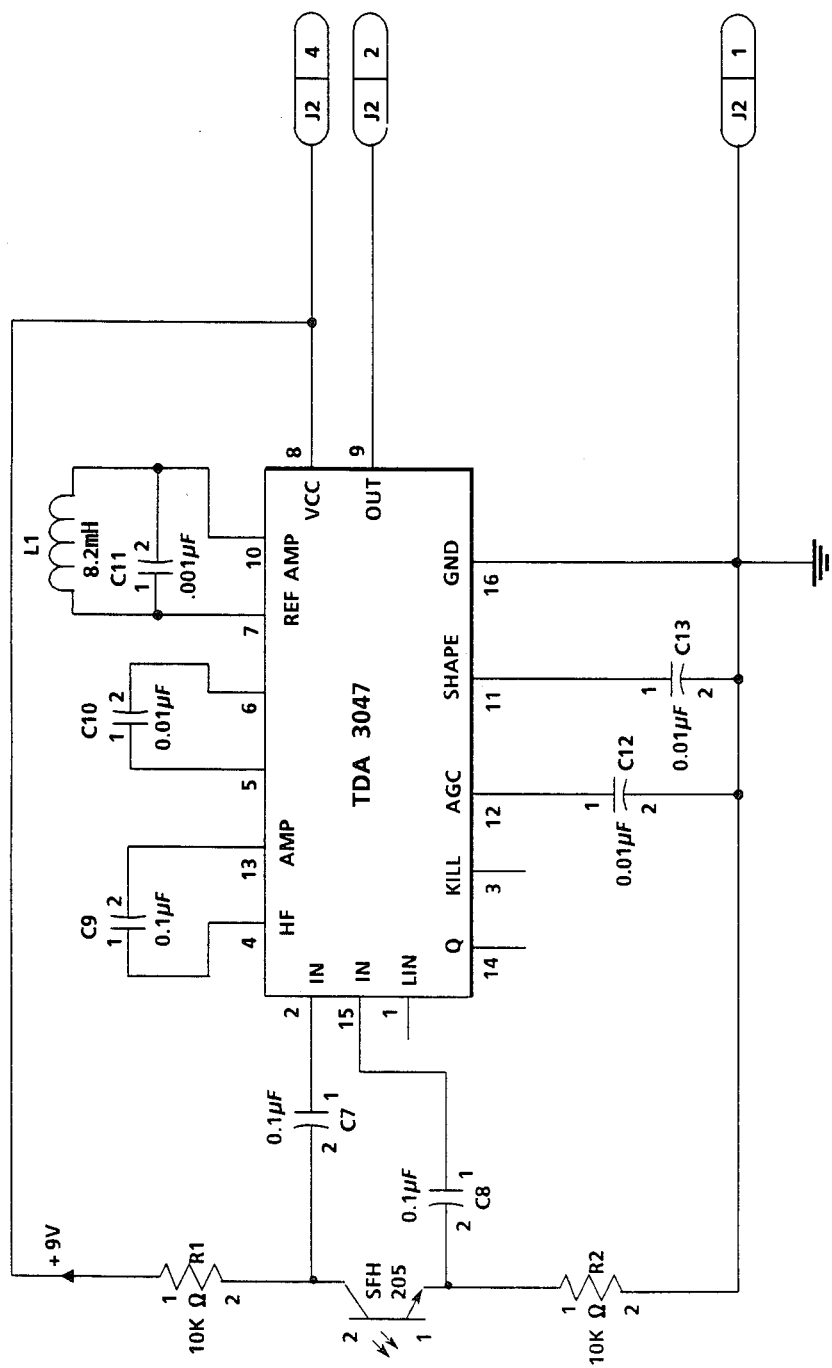

The IR receiver of FIG. 4B is similar to the sonic receiver of FIG. 4A except that the input transducer is a Seimens SFH205 IR phototransistor.

Figure 5:
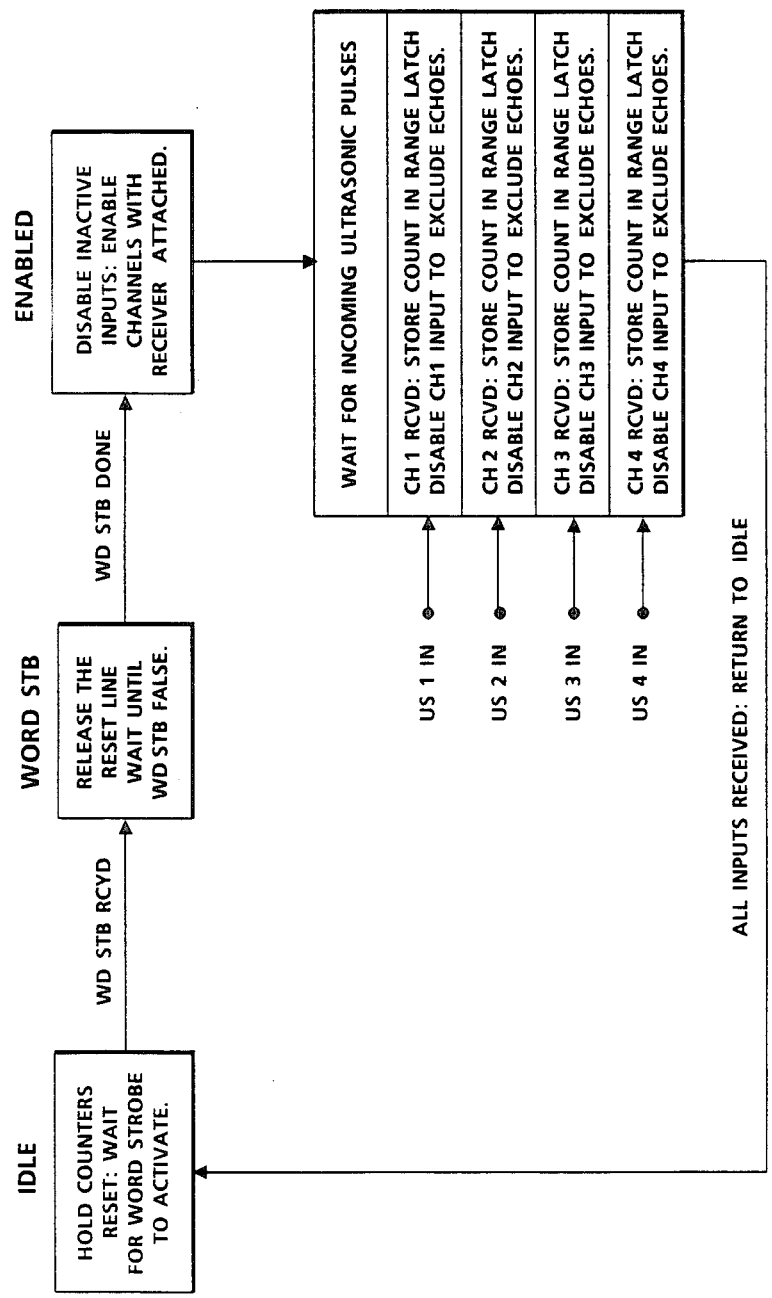
FIG. 5 is a state diagram of the range gate logic of FIG. 1.
Figures 1, 2, 6A:
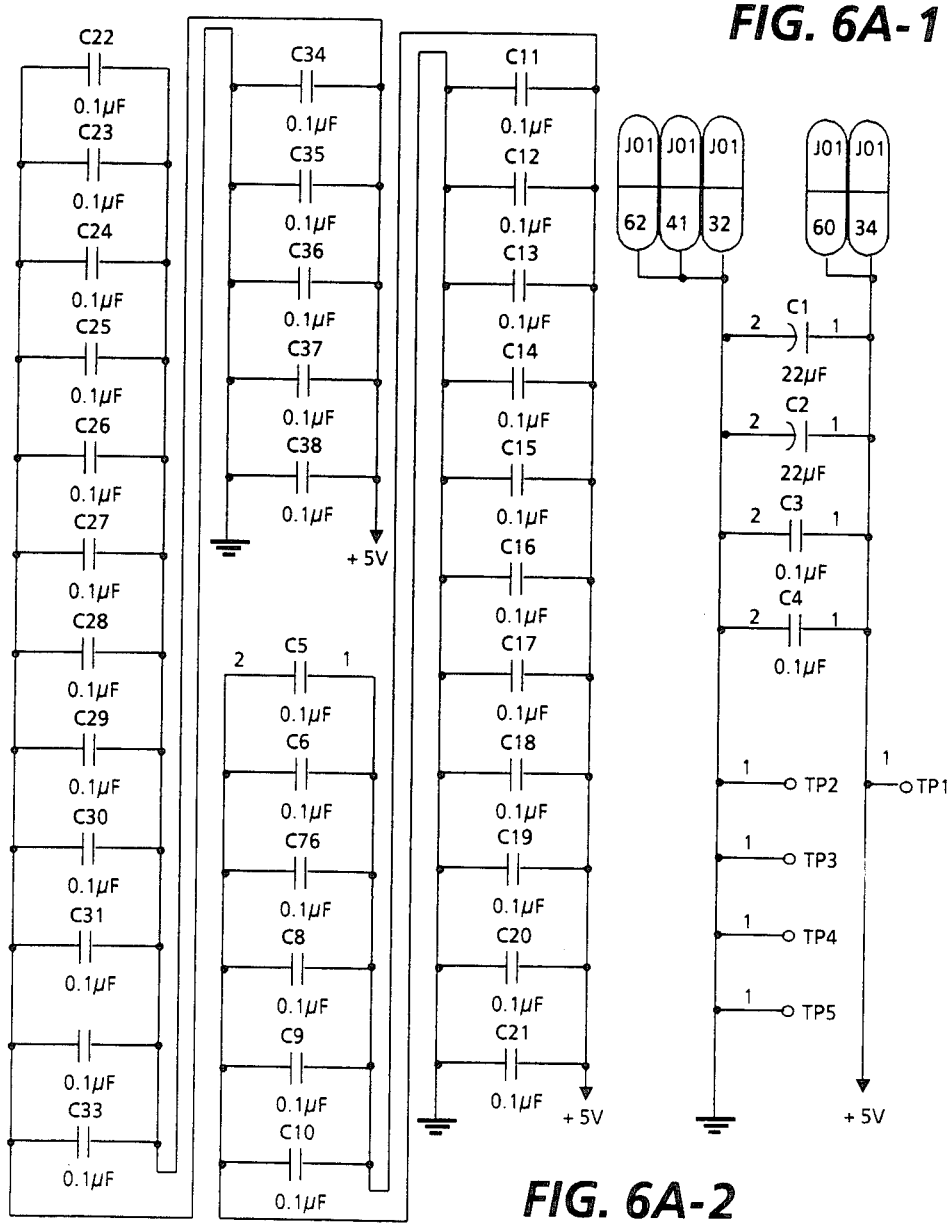
Figure 6B:
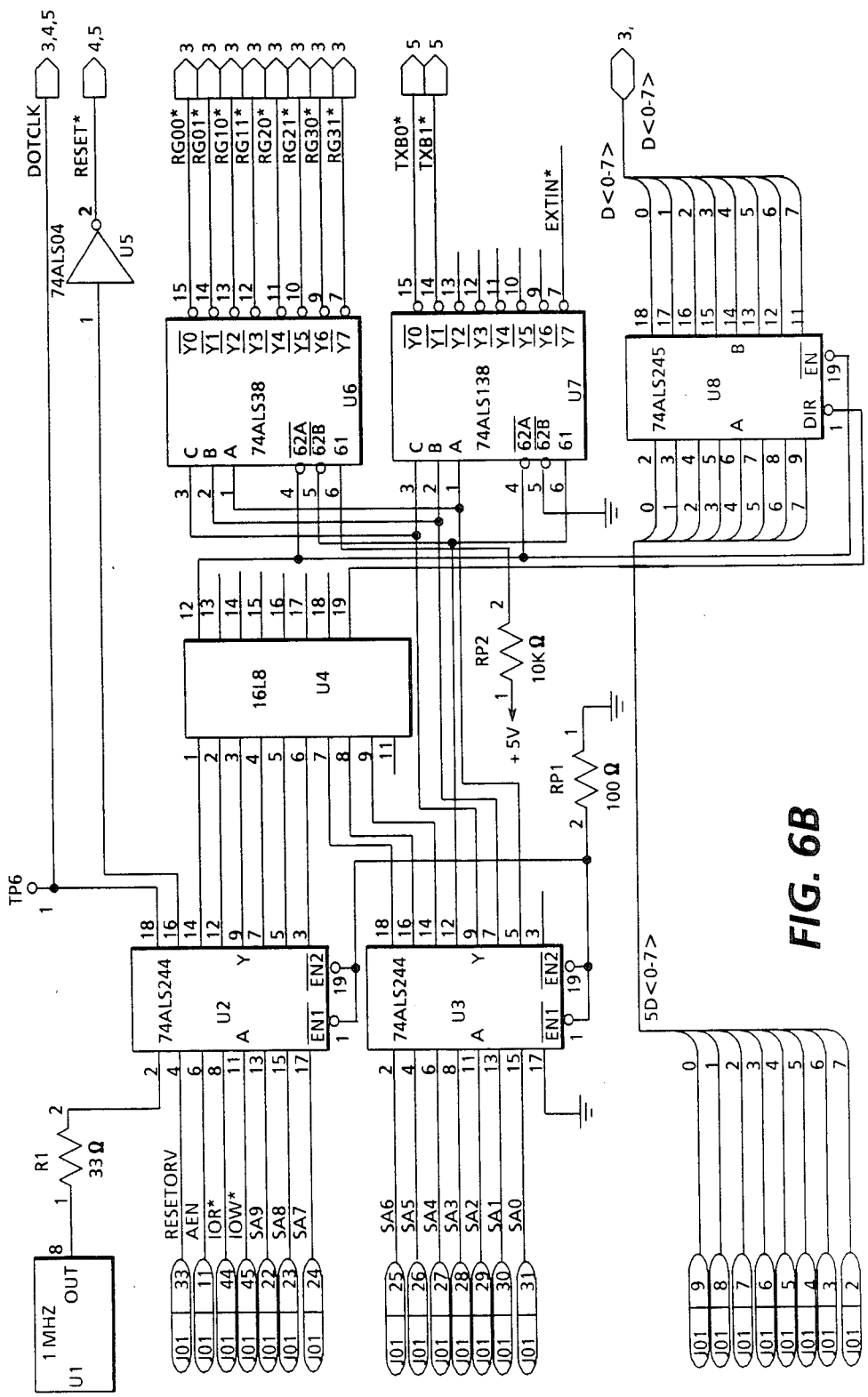
Figure 6C:
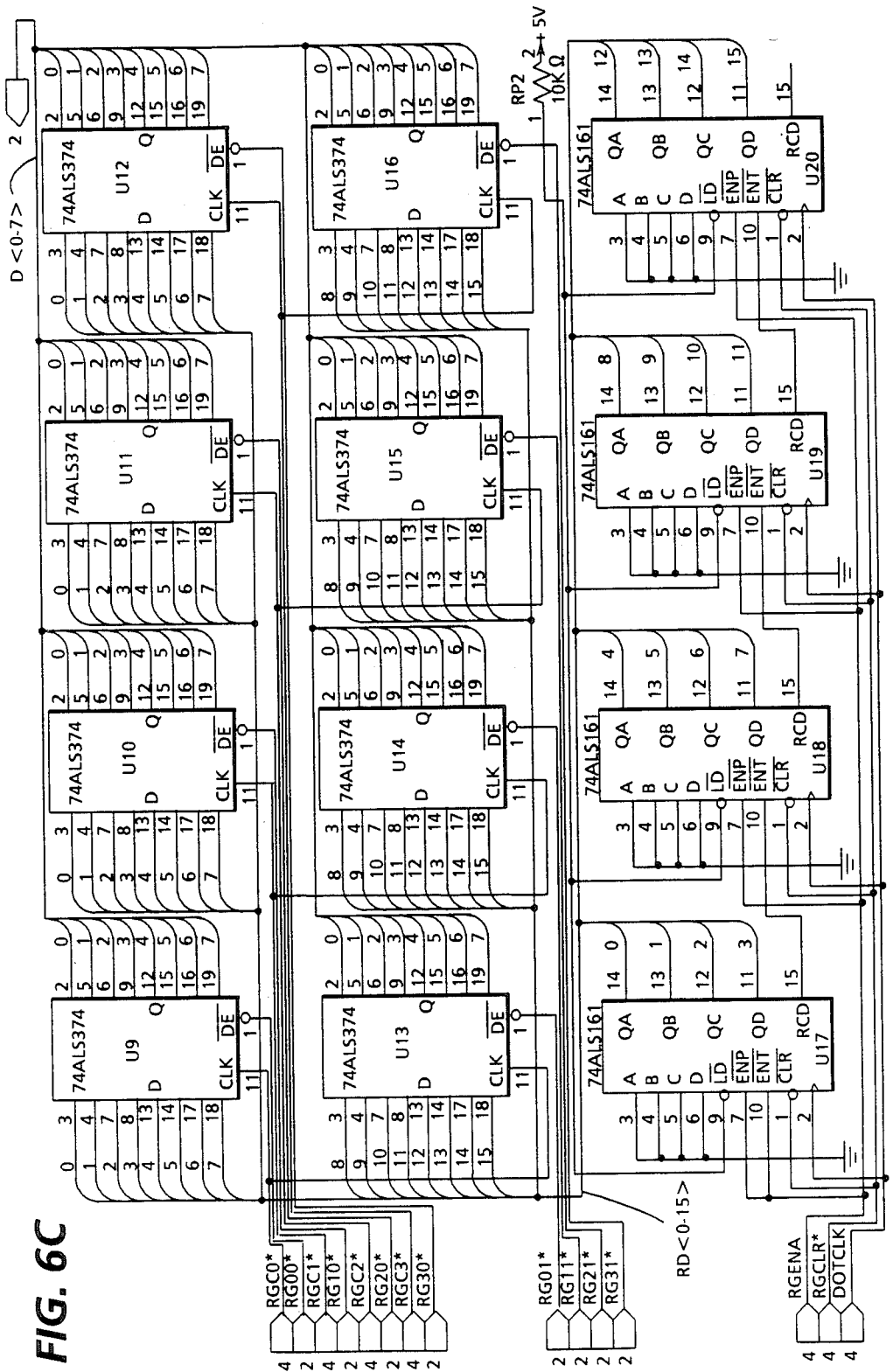
Figure 6D:
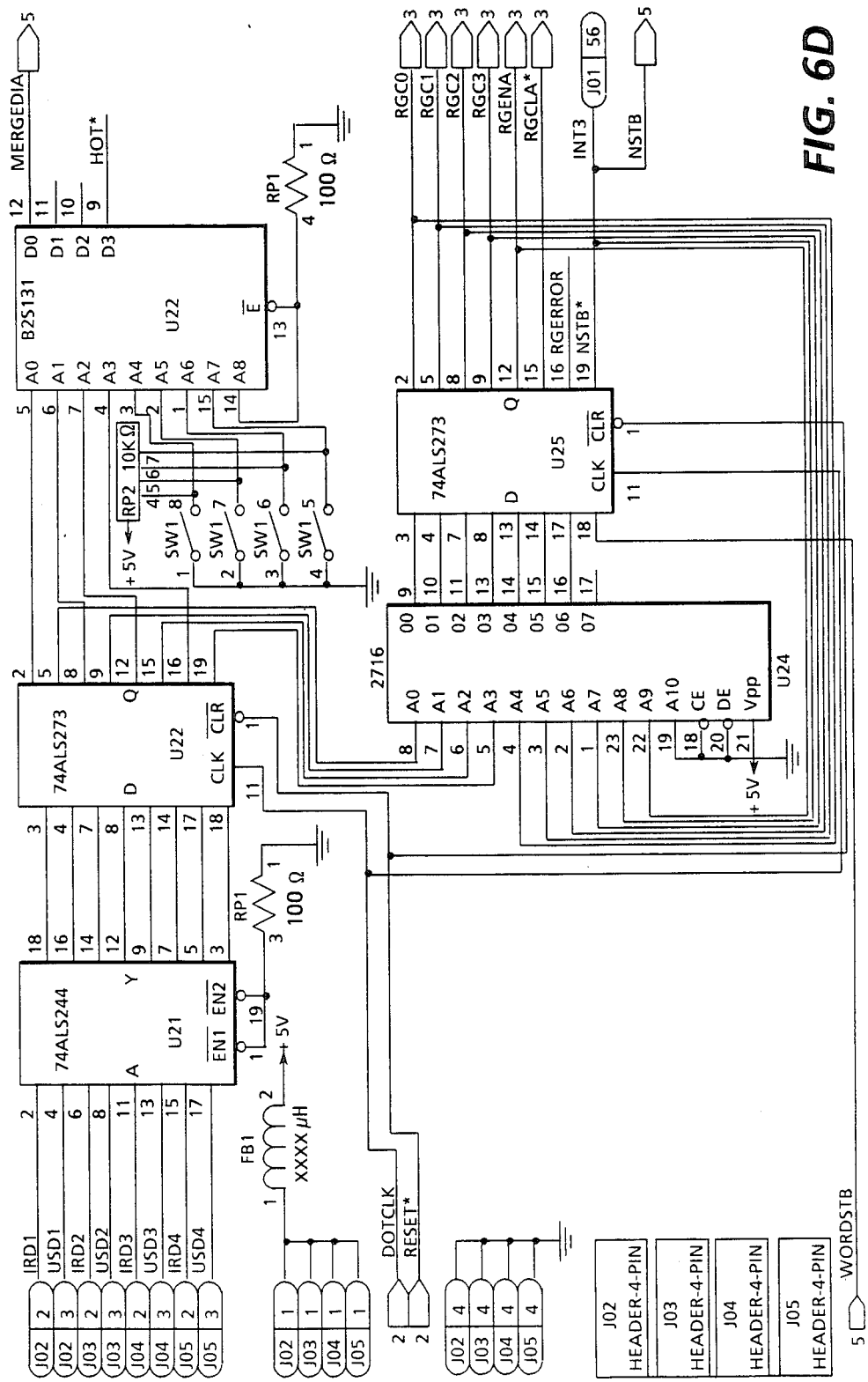
Figure 6E:
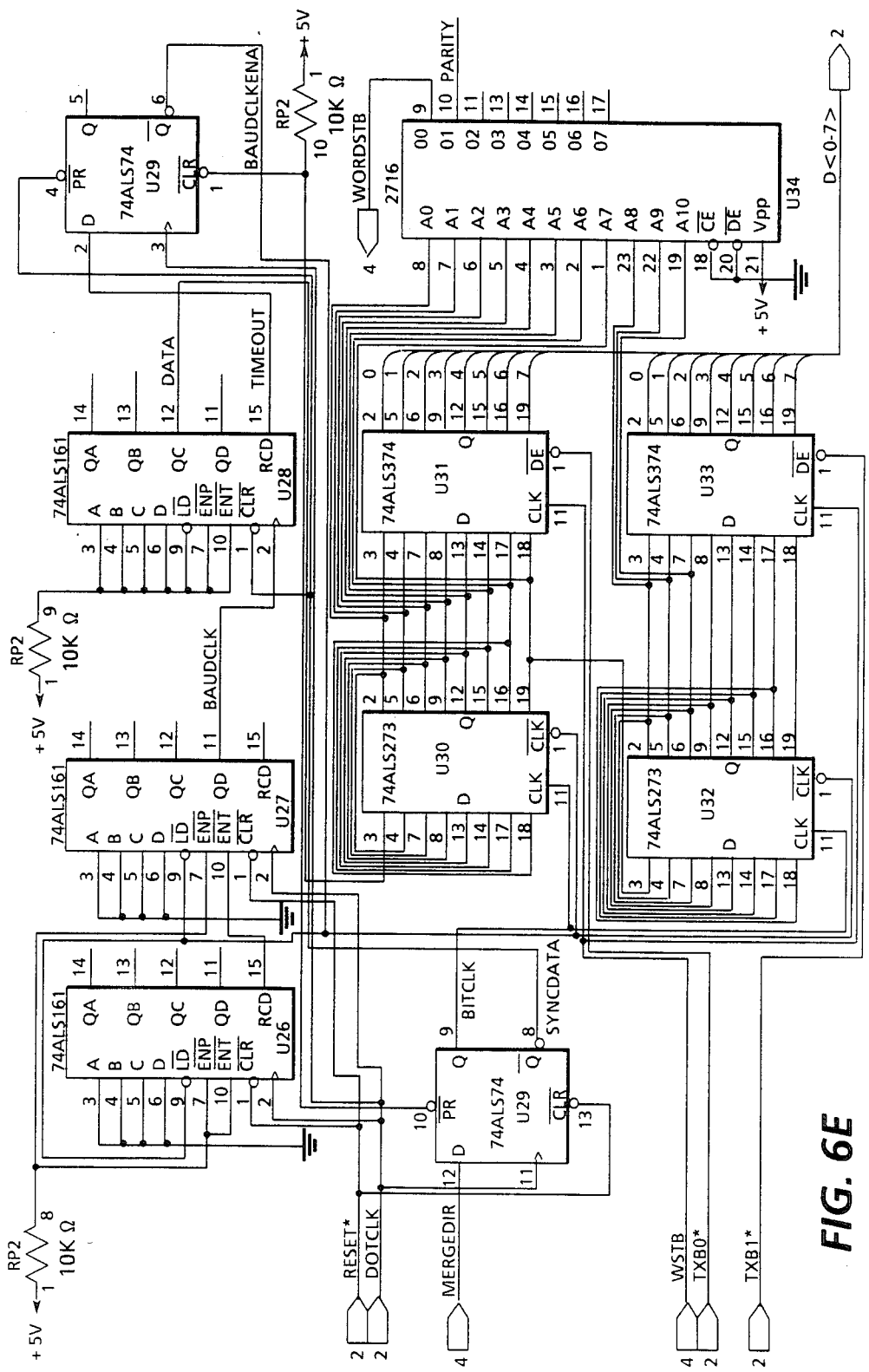

FIG. 5 is a state diagram of the range gate controller. At power-on or reset time the machine is in the "Idle" state and the latches and counters are all reset to zero. When an IR word is received, a circuit in the controller converts it from serial to parallel, and tests the word for validity. If it is a valid word, the PROM generates a word strobe which cycles the state machine into its "Word Strobe" state. Here the reset line to the counters is released. When the Word Strobe goes false, the Word Strobe Done signal is generated, cycling the machine into its "Enabled" state. Here the controller circuit decides which sonic receivers are active, disables the rest, and goes into its "Count" state. Here the counter is started, and the counts corresponding to the active receivers are loaded into their respective latches. To prevent echoes from generating erroneous data, each channel is disabled after its count is stored into its respective latch. Finally, the controller returns to the idle state.

FIGS. 6A–6E are a schematic diagram of the receiver logic subsystem, including range gate logic 10, range counter 11, latches 12, PC bus control logic 13, input buffers 26, serial to parallel converter 27, valid data word PROM 28 and system timing clock 29 of FIG. 1. The system is designed around the possibility of four IR receivers and four sound receivers. It is possible that as many as four sound receivers would be used, three if the system is designed to track the pointer in three dimensions, and a fourth if it becomes more convenient at some point to encode the switch data onto sound rather than IR pulses. Also, in case the IR line of sight from the stylus to one particular receiver is blocked, it would be convenient to have additional IR recievers. Putting one IR receiver with each microphone would make the system more reliable.

The receivers are connected to the controller through connectors, J2, J3, J4 and J5. Each connector supplies power and ground to the receiver and receives IR and sound data on two data lines, IRD 1 through 4 and USD 1 through 4. The total of eight data lines are coupled through buffer U21 and latch U22.

The four switches in device SW1 are set to indicate which connectors J2 through J5 are actually connected to an IR receiver. PROM U23 then inspects the data bits being received on these lines and votes in favor of two out of three in case of a disagreement. The data is coupled out from device U23 at pin 12 and is applied to flip-flop U29, which is clocked by the output of clock circuit U1 and buffer U2. This synthronizes the output of flip-flop U29 which is coupled out at pin 8. In case of power on, a reset signal will be coupled into flip-flop U29 at its pin 13 from buffer U2.

The clock pulses generated at clock generator U1 are counted down at counters U26 and U27 and applied to counter U28. Also, the sync data pulses from pin 8 of flip-flop U29 are applied to the Clear input of the same counter. The output from the counter U28 is taken at pin 12. If the counter can count up to the point where there is an output at pin 12 before the next Sync Data pulse clears the counter, then the system uses it as a One output. If however, a Sync Data pulse is applied to clear the counter U28 before pin 12 goes high, there will be no output, which is taken to be a Zero output.

Figure 7A:
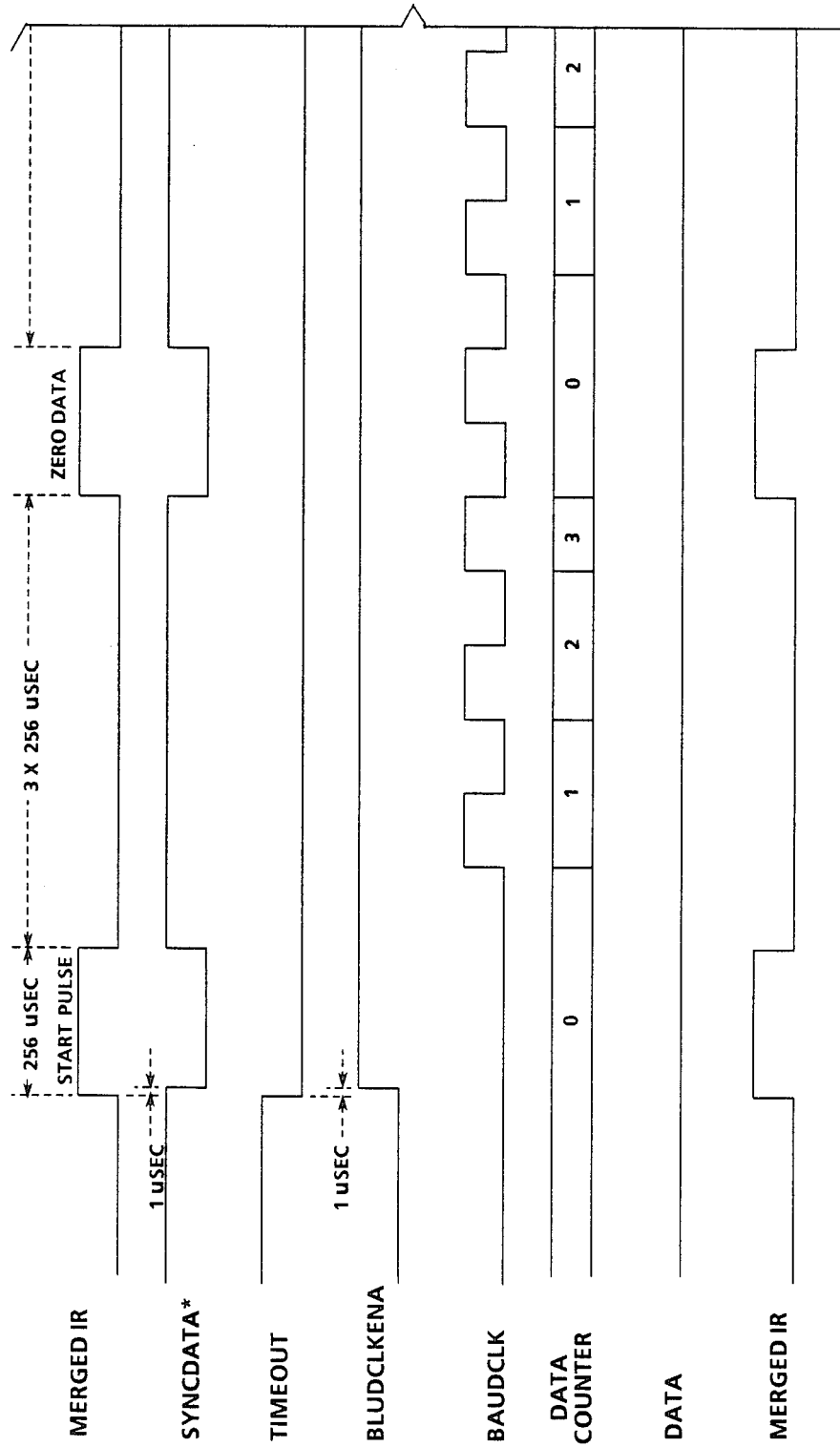

FIG. 7 shows the timing relationship between incoming data, counter U28, flip-flop U29 and the output data.

These output data pulses are applied to latch U30, U32 which converts these sixteen serial bits into parallel form. This sixteen bit word is next used to address PROM U34. If the bits are in the proper form, the word is accepted and coupled through latch U25, and then through latch U31 and U33 to the computer.

PROM U24 and latch U25 are used as a state machine to control the sonic delay counter which is implemented from four counters U17–20. The 1MHz clock from clock generator U1 is applied to the latch U25 while the system is in the idle mode. When the word strobe is received from the valid data PROM U34, counter U17–20 is started. Then as each sound pulse is detected by its associated microphone, the count of counter U17–20 will be entered into its associated latch, the first being U9, U13; the second being U10, U14; the third being U11, U15; and the fourth being U12, U16. This is accomplished by coupling the sound signals LUSD1-4 from latch U22 to the state machine which outputs signals RGC0-3 to the appropriate latches. These counts can now also be output to the computer through buffer U8.

This controller circuit is designed to interface with an IBM PC. The address and data lines of the PC bus that need to be connected to this controller circuit are attached through J01. Decoders U4, U6, U7 convert these addresses into logic signals that will unload the various storage latches in this controller as shown, and the data is transferred out through bi-directional buffer U8.

Figure 8:
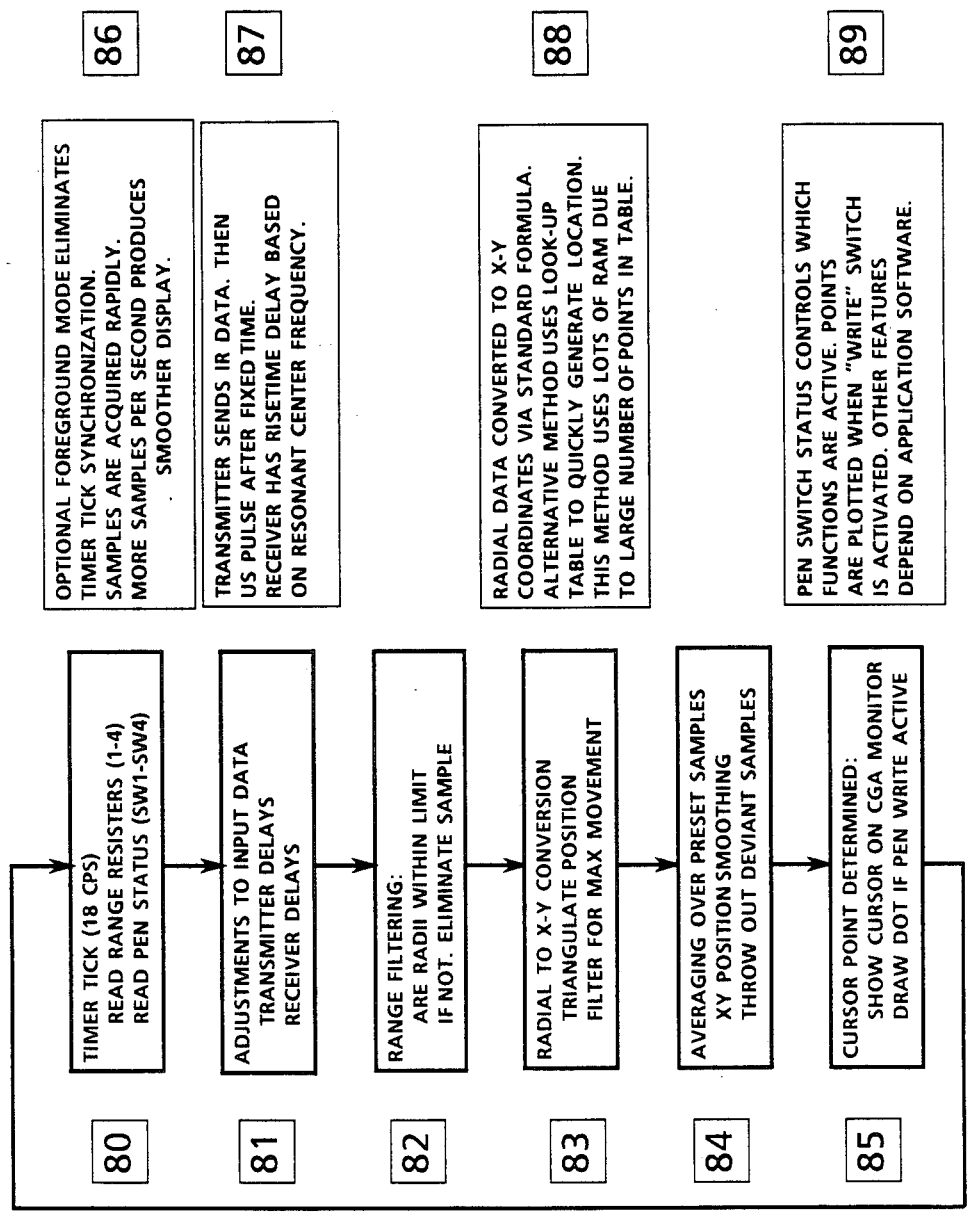
FIG. 8 is a software flow chart.

FIG. 8 is a flow chart of the system program which is written in Intel 8086 assembly language and runs on the IBM PC. The program can run in either a synchronous or asynchronous mode. In the synchronous mode, the program starts at step 80 when the program receives an interrupt based on an 18 cps timer tick. At this time the computer will read the range latches in the controller board and the stylus status word containing the switch information and stylus identification. This arrangement allows the computer to run another program in the foreground and service the stylus on an interrupt basis.

The alternative, shown in step 86, is to let the program free run in an asynchronous mode of about fifty cycles per second. This is faster than the rate at which the controller board state machine runs so that there are some controller cycles where the same latch information is read out twice. However, the readings are ultimately averaged so that the effect is not significant.

In the next step 81 adjustments in the form of subtractions from the range counts can be made to compensate for delays in the various circuits that would otherwise modify the triangulation calculation. Block 87 specifies two of these delays. One is the delay between the transmission of the last IR pulse and the start of the sonic pulse. Another is the time it takes for the receiver to react to a received sonic pulse. The program is set up so that the magnitude of these adjustments is under operator control.

The range counts are in the mathematical form of two radii. These are compared to the previous values. If there is a difference larger than a pre established limit, the readings are eliminated as erroneous in step 82. In step 83 the radii are converted to x y coordinates, and this position is again compared to a limit. As explained in block 88, this conversion can either be done as a calculation, which uses less memory, or as a table look-up, which uses less time.

At step 84 the last n position values are averaged, n being a number under operator control. A larger number will produce a smoother line while a smaller number will produce sharper detail. There is not much detail to be lost if a large number of calculations are averaged since the detail is already limited by the resolution of the CRT, which is in the order of 600 by 200 dots per screen in some applications.

Finally at step 85 the stylus position is displayed on the CRT through the use of a color graphics adapter (CGA) or equivalent, and also stored in memory if the stylus is in the write, as opposed to pointer, mode. Block 89 explains that the mode of the stylus, whether it be color, pointer, eraser, etc, is a function of the computer reading the switch positions and applying any arbitrary function by means of software.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

We claim:

1. A stylus for entering information into an electronic system comprising:
    a sound transmitter transducer located at a first end of said stylus for transmitting sound pulses to said system, each pulse comprising a continuous plurality of sound waves at a predetermined frequency, and
    a wireless transmitter for transmitting stylus data to said system, said stylus data comprising timing data for indicating to said system the timing of each sound pulse.

2. The stylus of claim 1 further comprising a contact switch responsive to contact between said first end and a solid surface, said stylus data including the state of this contact switch.

3. The stylus of claim 2 wherein said first end comprises the writing element of a writing instrument.

4. The stylus of claim 1 wherein said wireless transmitter is an infrared transmitter.

* * * * *